United States Patent
Kim et al.

(10) Patent No.: US 12,361,729 B2
(45) Date of Patent: Jul. 15, 2025

(54) SINGLE-STAGE 3-DIMENSION MULTI-OBJECT DETECTING APPARATUS AND METHOD FOR AUTONOMOUS DRIVING

(71) Applicant: CHUNGBUK NATIONAL UNIVERSITY INDUSTRY-ACADEMIC COOPERATION FOUNDATION, Cheongju-si (KR)

(72) Inventors: Gon Woo Kim, Daejeon (KR); Loc Duy Hoang, Cheongju-si (KR)

(73) Assignee: CHUNGBUK NATIONAL UNIVERSITY INDUSTRY-ACADEMIC COOPERATION FOUNDATION, Cheongju-si (KR)

( * ) Notice: Subject to any disclaimer, the term of this patent is extended or adjusted under 35 U.S.C. 154(b) by 585 days.

(21) Appl. No.: 17/545,237

(22) Filed: Dec. 8, 2021

(65) Prior Publication Data
US 2023/0071437 A1 Mar. 9, 2023

(30) Foreign Application Priority Data
Aug. 17, 2021 (KR) .......................... 10-2021-108154

(51) Int. Cl.
*G06K 9/00* (2022.01)
*G01S 17/89* (2020.01)
(Continued)

(52) U.S. Cl.
CPC .............. *G06V 20/64* (2022.01); *G01S 17/89* (2013.01); *G06N 3/08* (2013.01); *G06V 10/766* (2022.01); *G06V 10/82* (2022.01)

(58) Field of Classification Search
None
See application file for complete search history.

(56) References Cited

U.S. PATENT DOCUMENTS

| | | |
|---|---|---|
| 2019/0003836 A1 | 1/2019 | Zhang et al. |
| 2019/0188541 A1* | 6/2019 | Wang .................... G01S 7/4802 |

(Continued)

FOREIGN PATENT DOCUMENTS

| | | |
|---|---|---|
| JP | 2017-166971 A | 9/2017 |
| JP | 2019-532433 A | 11/2019 |

(Continued)

OTHER PUBLICATIONS

Bin Yang, "Auto4D: Learning to Label 4D Objects from Sequential Point Clouds", arXiv:2101.06586v2 [cs.CV] Mar. 11, 2021, pp. 1-8. (Year: 2021).*

(Continued)

*Primary Examiner* — Wei Wen Yang
(74) *Attorney, Agent, or Firm* — Sughrue Mion, PLLC

(57) ABSTRACT

According to at least one embodiment, the present disclosure provides an apparatus for single-stage three-dimensional (3D) multi-object detection by using a LiDAR sensor to detect 3D multiple objects, comprising: a data input module configured to receive raw point cloud data from the LiDAR sensor; a BEV image generating module configured to generate bird's eye view (BEV) images from the raw point cloud data; a learning module configured to perform a deep learning algorithm-based learning task to extract a fine-grained feature image from the BEV images; and a localization module configured to perform a regression operation and a localization operation to find 3D candidate boxes and classes corresponding to the 3D candidate boxes for detecting 3D objects from the fine-grained feature image.

6 Claims, 6 Drawing Sheets

(51) Int. Cl.
*G06N 3/08* (2023.01)
*G06V 10/766* (2022.01)
*G06V 10/82* (2022.01)
*G06V 20/64* (2022.01)

(56) References Cited

U.S. PATENT DOCUMENTS

| | | | |
|---|---|---|---|
| 2020/0081124 A1 | 3/2020 | Shi | |
| 2021/0048529 A1* | 2/2021 | Roy Chowdhury | ... G06V 20/56 |
| 2021/0082181 A1 | 3/2021 | Shi et al. | |
| 2021/0157006 A1 | 5/2021 | Sun et al. | |
| 2022/0153310 A1* | 5/2022 | Yang | ................ G05D 1/0221 |

FOREIGN PATENT DOCUMENTS

| | | |
|---|---|---|
| JP | 2020-42009 A | 3/2020 |
| JP | 2021-82296 A | 5/2021 |
| JP | 2021-532442 A | 11/2021 |
| KR | 10-1655606 B1 | 9/2016 |

OTHER PUBLICATIONS

Bin Yang et al., "PIXOR: Real-time 3D Object Detection from Point Clouds", IEEE/CVF Conference on Computer Vision and Pattern Recognition, 2018, pp. 7652-7660 (9 pages total).

Yi Zhang et al., "Accurate and Real-time Object Detection based on Bird's Eye View on 3D Point Clouds", International Conference on 3D Vision (3DV), 2019, pp. 214-221 (8 pages total).

Guojun Wang et al., "CenterNet3D: An Anchor free Object Detector for Autonomous Driving", Arxiv.Org, 2020, pp. 1-9 (9 pages total).

Guojun Wang et al., "CenterNet3D: An Anchor Free Object Detector for Point Cloud", IEEE Transactions on Intelligent Transportation Systems, 2020, pp. 1-13 (13 pages total).

Extended European Search Report dated May 24, 2022 in European Application No. 21213697.2.

* cited by examiner

SINGLE-STAGE 3-DIMENSION MULTI-OBJECT DETECTING APPARATUS AND METHOD FOR AUTONOMOUS DRIVING

CROSS-REFERENCE TO RELATED APPLICATIONS

This application is based on, and claims priority from, Korean Patent Application Number 10-2021-0108154, filed Aug. 17, 2021, the disclosure of which is incorporated by reference herein in its entirety.

TECHNICAL FIELD

The present disclosure in at least one embodiment relates to a multi-object detection apparatus. More particularly, the present disclosure relates to an efficient and compact single-stage three-dimensional multi-object detection apparatus for autonomous driving.

BACKGROUND

For an autonomous driving of an unmanned vehicle, a driving route needs to be generated upon detecting a moving object in front and estimating its dynamic motion. Currently, studies are being conducted on such a dynamic object detection and tracking methods using radar and cameras. With the recent cost down of laser scanners, it is a tendency that a majority of automakers are adopting a driver-assistance system in their cars.

For the detection of a moving object using a laser scanner, laser pointers are respectively converted to depth values to generate a point cloud around the vehicle equipped with the scanner. Since each point itself in the point cloud gives no specific meaning, detecting and tracking a moving object requires multiple points to be grouped through a clustering technique into a single object.

In such a process, perception of driving environment plays an essential role in autonomous driving tasks and demands robustness in cluttered dynamic environments such as complex urban scenarios.

Automated driving systems capable of performing all driving tasks under any and all roadway and environmental conditions, are classified into the highest level of automation defined by the Society of Automotive Engineers (SAE) International. While Advanced Driving Assistants (ADAs) are currently commercially available, they either require human intervention or operate only under limited environmental conditions. The implementation of this autonomy has put forth huge requirements on the associated research domains, including Multiple Object Detection and Tracking (MODT). Understanding dynamic properties of coexisting entities in the environment is crucial for enhancing the overall automation since the knowledge directly impacts the quality of localization, mapping, and motion planning.

Over the past decade, numerous MODT approaches using cameras for recognition have been studied. Objects are detected by the camera reference frame either in a 2D coordinate system or in a 3D coordinate system under a stereo setup, producing 2D or 3D trajectories, respectively. However, a spatial information obtained by utilizing camera geometry suffers from inconsistent accuracy, and the field of view (FOV) remains limited. Such a panoramic camera-based tracking is yet to be developed. The camera-based approaches also face various challenges, including object truncation, poor lighting conditions, high-speed targets, sensor motion, and interactions between targets.

In autonomous driving tasks, the 3D object coordinates require high level of accuracy and robustness in its positioning function. Most of object detectors work upon the vehicle-installed systems. To overcome these constraints, efficient and compact 3D detection frameworks are required within the context of a full self-driving embedded system. Therefore, a compact 3D object detection using point cloud techniques needs to be embedded system-friendly so it can help achieve more feasible autonomous driving.

Recently, detection technology using Light Detector and Ranging (LiDAR) has become increasingly popular, providing sparse panoramic information of the environment. Capable of providing panoramic sparse measurements, ranging up to as wide as 100 m, and at a reasonable rate of 10-15 Hz, LiDARs are regarded as an ideal sensor for MODT tasks.

Among the various sensors, LiDAR stands as an ideal candidate for the 3D object detection task since it can provide a robot vision with 3D point clouds, which are ubiquitous in many mobile robotics applications, and in autonomous driving in particular. In addition, unlike visual information, LiDAR provides, against any weather, highly sparse point density distribution due to factors such as non-uniform sampling of 3D real-world, effective operating range, occlusion, noise, and relative pose, for which visual sensors provide only limited performance.

SUMMARY

According to at least one embodiment, the present disclosure provides an apparatus for single-stage three-dimensional (3D) multi-object detection by using a LiDAR sensor to detect 3D multiple objects, comprising: a data input module configured to receive raw point cloud data from the LiDAR sensor; a BEV image generating module configured to generate bird's eye view (BEV) images from the raw point cloud data; a learning module configured to perform a deep learning algorithm-based learning task to extract a fine-grained feature image from the BEV images; and a localization module configured to perform a regression operation and a localization operation to find 3D candidate boxes and classes corresponding to the 3D candidate boxes for detecting 3D objects from the fine-grained feature image.

The BEV image generating module is configured to generate the BEV images by projecting the raw 3D point cloud data into 2D pseudo-images and discretizing a result of the projecting.

The BEV image generating module is configured to generate four feature map images based on a height, a density, an intensity, and a distance of the raw 3D point cloud data, by encoding the raw 3D point cloud data.

The learning module may be configured to perform a convolutional neural network-based (CNN-based) learning task.

According to another embodiment, the present disclosure provides a method performed by an apparatus for single-stage three-dimensional (3D) multi-object detection by using a LiDAR sensor to detect 3D multiple objects, the method comprising: performing a data input operation by receiving raw point cloud data from the LiDAR sensor; generating bird's eye view (BEV) images from the raw point cloud data; performing a deep learning algorithm-based learning task to extract a fine-grained feature image from the BEV images; and performing a regression operation and a localization operation to find 3D candidate boxes and classes corresponding to the 3D candidate boxes for detecting 3D objects from the fine-grained feature image.

The generating of the BEV images may include generating the BEV images by projecting the raw 3D point cloud data into 2D pseudo-images and discretizing a result of the projecting.

The generating of the BEV images may include generating four feature map images based on a height, a density, an intensity, and a distance of the raw 3D point cloud data, by encoding the raw 3D point cloud data.

The performing of the deep learning algorithm-based learning task may include performing a convolutional neural network-based (CNN-based) learning task.

DETAILED DESCRIPTION

Figure 1:
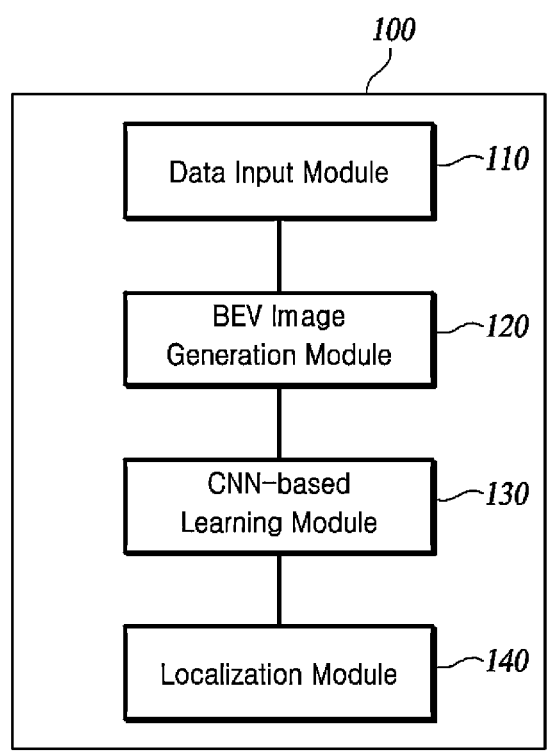
FIG. 1 is a block diagram of the configuration of a 3D multi-object detection apparatus according to at least one embodiment of the present disclosure.

The present disclosure in at least one embodiment aims to provide a compact and efficient 3D object detector framework by utilizing point cloud projection methods and anchor-free methods, which excels the existing state-of-the-art point cloud projection methods in terms of performance.

The objects of the present disclosure are not limited to those particularly described hereinabove and the above and other objects that the present disclosure could achieve will be clearly understood by those skilled in the art from the following detailed description.

Advantages and features of the embodiments disclosed herein, and methods of achieving them will become apparent by referring to the relevant descriptions below in conjunction with the accompanying drawings. However, the embodiments to be presented by the present disclosure are not limited to the embodiments disclosed below but may be implemented in various forms, and the present embodiments are merely provided to those of ordinary skill in the art to fully indicate the category of the embodiments.

The terms used in this specification will be briefly described before proceeding to the detailed description.

The terms used in this specification have been selected as currently widely used common terms as possible while considering the functions of the disclosed embodiments, but these are subject to change by the intention of a person skilled in the art, a precedent, or the emergence of new technology, etc. Some of the terms may be arbitrarily selected by the applicant, wherein the meaning will accompany the relevant detailed description in the specification. Therefore, the terms used herein should be defined based on the meaning of the terms together with the description throughout the specification rather than as mere designations of entities.

The terms used in this specification with singular articles "a," "an," and "the" are intended to include their plural equivalents as well unless the context specifies them as being singular.

Throughout this specification, when parts "include" or "comprise" a component, they are meant to further include other components, not excluding thereof unless there is a particular description contrary thereto. At least one of the components, elements, modules or units (collectively "modules" in this paragraph) termed as such in this specification or represented by a block in the drawings may be embodied as various numbers of hardware, software and/or firmware structures that execute respective functions described above, according to an example embodiment. According to example embodiments, at least one of these modules may use a direct circuit structure, such as a memory, a processor, a logic circuit, a look-up table, etc. that may execute the respective functions through controls of one or more microprocessors or other control apparatuses. Also, at least one of these modules may be specifically embodied by a program, or a part of code, which contains one or more executable instructions for performing specified logic functions, and executed by one or more microprocessors or other control apparatuses. Further, at least one of these modules may include or may be implemented by a processor such as a central processing unit (CPU) that performs the respective functions, a microprocessor, or the like. Two or more of these modules may be combined into one single module which performs all operations or functions of the combined two or more components. Also, at least part of functions of at least one of these modules may be performed by another of these modules. Functional aspects of the embodiments described herein may be implemented in algorithms that execute on one or more processors. Furthermore, the modules represented by a block or processing steps may employ any number of related art techniques for electronics configuration, signal processing and/or control, data processing and the like.

Hereinafter, some embodiments of the present disclosure will be described in detail by referring to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

The present disclosure relates to a single-stage 3D multi-object detection apparatus and method for detection of 3D multi-objects by using a LiDAR sensor.

FIG. 1 is a block diagram of the configuration of a 3D multi-object detection apparatus 100 according to at least one embodiment of the present disclosure.

As shown in FIG. 1, the 3D multi-object detection apparatus 100 according to at least one embodiment includes a data input module 110, a Bird's Eye View (BEV) image generation module 120, a learning module 130, and a localization module 140.

The data input module 110 receives raw point cloud data from a LiDAR sensor.

The BEV image generation module 120 generates a BEV image from the raw point cloud data.

The learning module 130 performs deep learning algorithm-based learning to extract a fine-grained or subdivided feature image from the BEV image.

In at least one embodiment of the present disclosure, the learning module 130 performs Convolutional Neural Network (CNN)-based learning.

The localization module 140 performs a regression operation and a localization operation to find, in the subdivided feature image, 3D candidate boxes and their corresponding classes for detecting a 3D object.

The BEV image generation module 120 may generate a BEV image by projecting and discretizing the raw 3D point cloud data into 2D pseudo-images.

The BEV image generation module 120 may encode the raw 3D point cloud data to generate four feature map images based on a height feature map, a density feature map, an intensity feature map, and a distance feature map.

Figure 2:
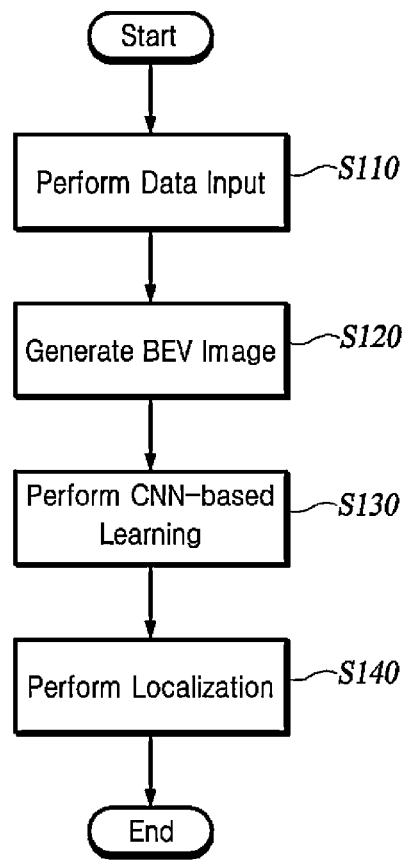
FIG. 2 is a flowchart of a 3D multi-object detection method according to at least one embodiment of the present disclosure.

FIG. 2 is a flowchart of a 3D multi-object detection method according to at least one embodiment of the present disclosure.

As shown in FIG. 2, the 3D multi-object detection method includes performing a data input operation by receiving raw point cloud data from the LiDAR sensor (S110), generating BEV images from the raw point cloud data (S120), performing a deep learning algorithm-based learning task to extract a fine-grained feature image from the BEV images (S130), and performing a regression operation and a localization operation to find 3D candidate boxes and classes corresponding to the 3D candidate boxes for detecting 3D objects in the fine-grained feature image (S140).

The step of generating BEV images (S120) may generate the BEV images by projecting and discretizing raw 3D point cloud data into 2D pseudo-images.

The step of generating BEV images (S120) may encode the raw 3D point cloud data to generate four feature map images based on a height feature map, a density feature map, an intensity feature map, and a distance feature map.

The step of performing a deep learning algorithm-based learning task (S130) may perform a convolutional neural network-based (CNN-based) learning task.

The present disclosure provides an efficient and compact single-stage 3D multi-object detection apparatus for a real-time and secure system. First, a compact 2D representation of LiDAR sensor data is utilized, followed by an introduction of a CNN method suitable for extracting detailed functions for a learning task. The present disclosure estimates the heading angle as well as the 3D bounding box position.

The following describes a learning and inference partial strategy of the present disclosure toward compact input generation, a suitable CNN architecture, and localization of the final 3D object candidates.

Figure 3:
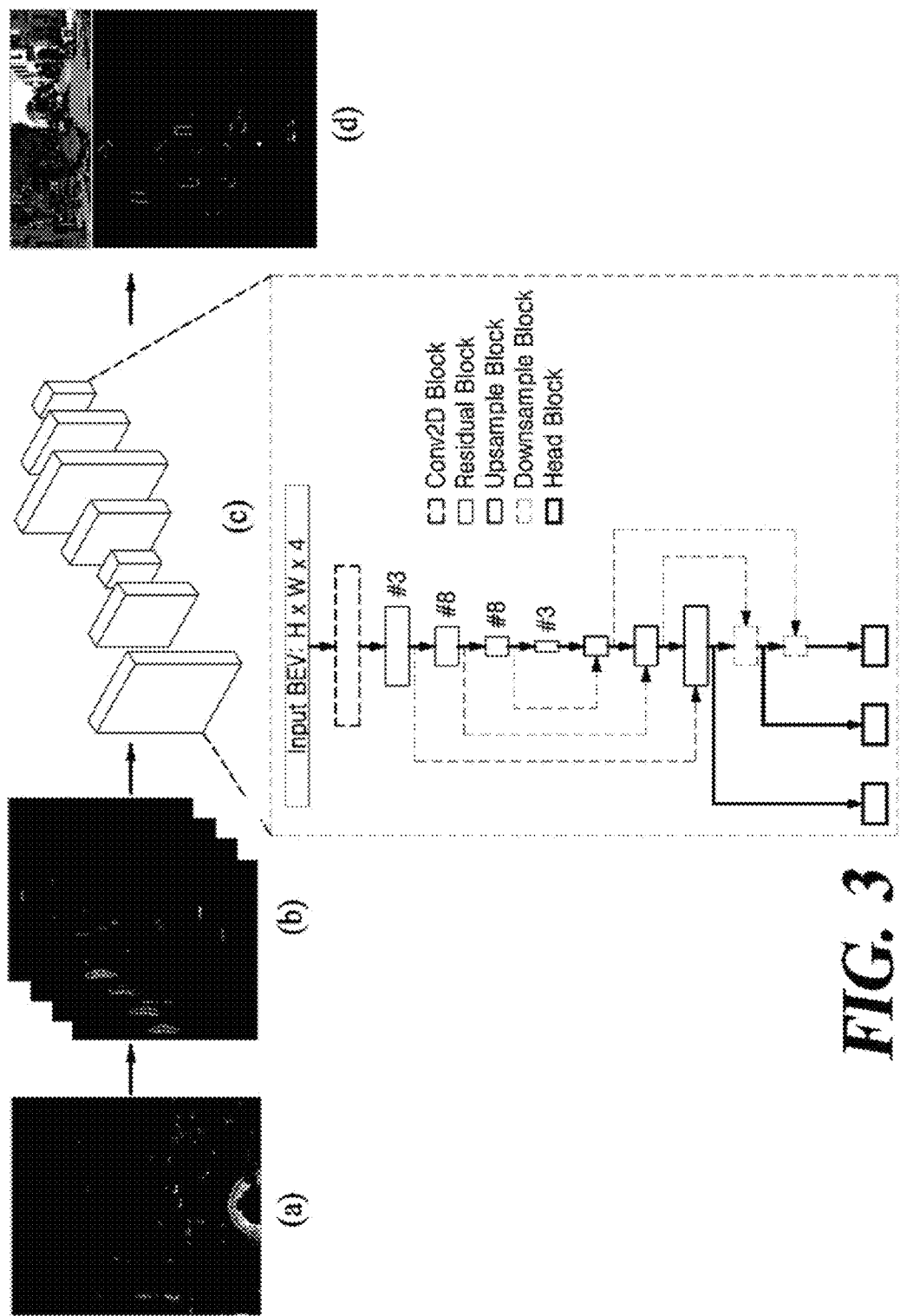
FIG. 3 is a diagram illustrating an overall framework of a 3D multi-object detection apparatus according to at least one embodiment of the present disclosure.

FIG. 3 is a diagram illustrating an overall framework of a 3D multi-object detection apparatus according to at least one embodiment of the present disclosure.

As shown in FIG. 3, the overall framework of the single-stage 3D multi-object detection apparatus of the present disclosure is composed of four parts including (a) receiving raw point-cloud data inputted from a LiDAR sensor, (b) generating BEV pseudo images which include four feature images from the raw point cloud in a compact way, (c) performing CNN-based learning to extract the fine-grained feature image for learning task and having multiple head blocks, and (d) performing regression and localization to find 3D candidate boxes and their corresponding classes.

The generation of BEV (Bird's Eye View) is done as follows.

Figure 4:
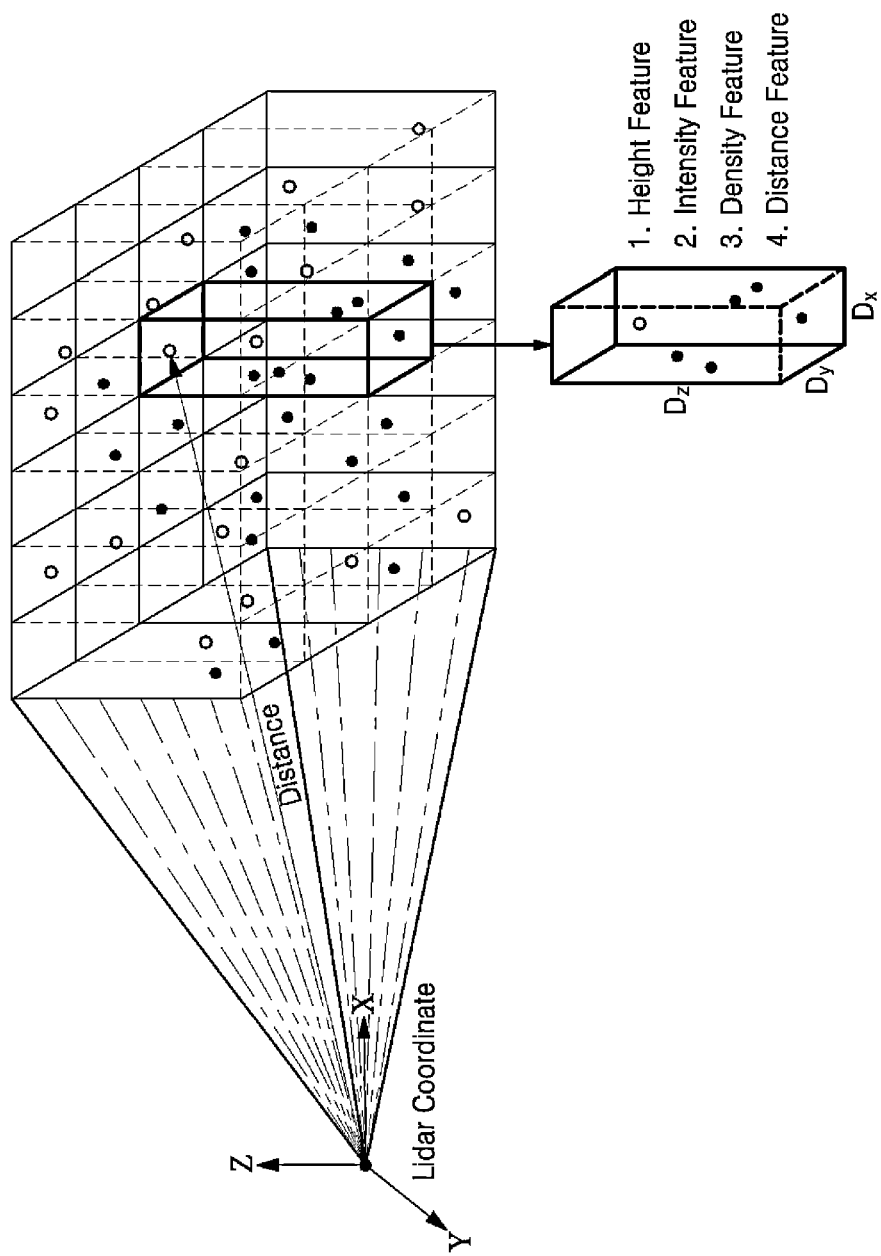
FIG. 4 shows a detailed structure of a Bird's Eye View (BEV) feature map generation.

FIG. 4 shows a detailed structure of a Bird's Eye View feature map generation.

As shown in FIG. 4, the 3D multi-object detection apparatus of at least one embodiment extracts four compact feature maps, the features including a height feature, an intensity feature, a density feature, and a distance feature.

The existing approach usually encodes the raw 3D LiDAR point cloud data into standard 3D grid cells and a standard voxel representation, where a sparse 3D CNN is used to extract the features. However, most of the 3D spaces are sparse or empty, so these methods are not considered optimized approaches, which leads to both time and hardware inefficient. Alternatively, the raw 3D LiDAR point cloud data is encoded into Front View (FV) representation. Although these representations are compact, they cannot get rid of the object overlapping problems.

The LiDAR sensor provides the 3D point location (x, y, z) and reflectance value r of every point and obtains thousands to millions of points per second.

The present disclosure provides a novel compact BEV generation, which projects and discretizes the raw 3D point cloud data into 2D pseudo-images. This is considered a time-efficient preprocessing scheme wherein the object's physical shapes remain explicitly.

Over the total investigated space of the 3D environment, L×W×H is encoded by the single height, density, intensity, and distance feature maps.

The height feature has cell values each calculated as the maximum height among the point heights within the cell. Then, a normalization step is applied to get the normalized height feature map.

The density feature indicates the density of points within the cell with various point cloud distributions in the 3D real-world. The density feature is normalized by a formula of $$\min\left(1, \frac{\log(Q+1)}{\log(64)}\right),$$

where Q is the quantity of the points within the cell.

The intensity feature is recorded with LiDAR intensity and the return strength of a laser beam, reflecting object surface value between [0,1]. In the present disclosure, the intensity feature is the raw reflectance value of the point, which has a maximum height in the reference cell.

Most of the cells are sparse or empty, especially for the far range, and an examination of the training dataset confirmed that mostly 97% number of point clouds are located in the first [0, 30 m] range along to X direction. The point cloud distribution in terms of distance on the training dataset is clearly shown in FIG. 5.

Figure 5:
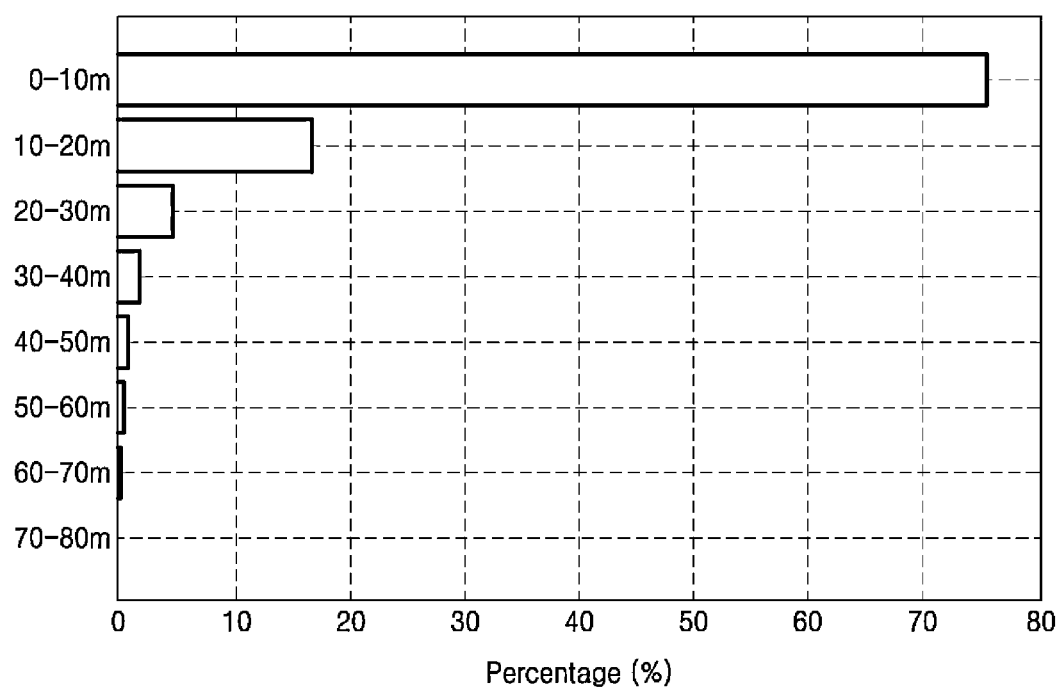
FIG. 5 is a graph showing the average point cloud distribution in terms of distance on a region of interest in training dataset samples.

FIG. 5 is a graph showing the average point cloud distribution on the region of interest in the front view of [0, 80 m]>[−40 m, 40 m]×[−2.8 m, 1.2 m] of 7481 samples of the training dataset.

Physically, this point cloud distribution as shown in FIG. 5 is based on the difference between the LiDAR scanning angles and the scene scenarios. For the short-range, the beaming angle is so small that the LiDAR sensor acquired many points, while in the long-range, it obtains a small number of points because of the larger beaming angles. The present disclosure presents this feature map for complementing the distance information and reinforcing the BEV representation. This feature map is useful for the learning task and further helps the model to learn the point clouds distribution by range. The normalized distance feature $D_{i\_norm}$ in each cell is calculated by Equation 1.

$$D_{i\_norm} = \frac{D_{O \to P_i}}{D_{max}} = \frac{\sqrt{(x_{Pi}^2 + y_{Pi}^2 + z_{Pi}^2)}}{\sqrt{(x_{max}^2 + y_{max}^2 + z_{max}^2)}} \quad \text{Equation 1}$$

Here, $D_{O \to P_i}$ is the distance between the LiDAR origin (0, 0, 1.73 m) and the current point $P_i$. $D_{max}$ is the possible max distance from the LiDAR origin to the furthest point $P_{max}$ within the investigated area $\psi$. $(x_{Pi}, y_{Pi}, z_{Pi})$ and $(x_{max}, y_{max}, z_{max})$ are the locations of the points $P_i$ and $P_{max}$, respectively.

Figure 6:
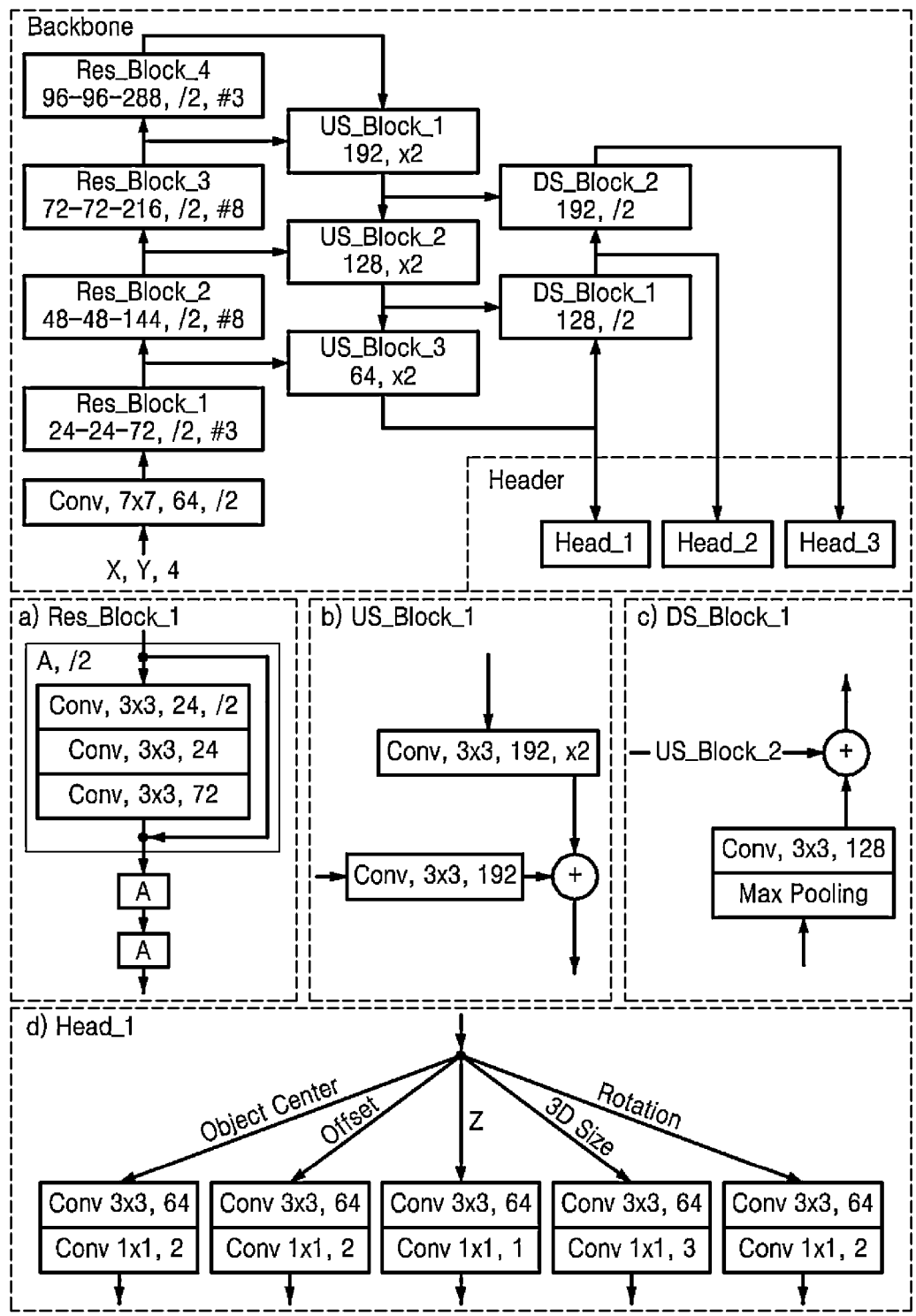
FIG. 6 shows a detailed CNN architecture of a 3D multi-object detection apparatus according to at least one embodiment of the present disclosure.

The quick and efficient 3D multi-object detection apparatus of the present disclosure takes a network architecture that robustly exploits and learns the 2D representation of LiDAR point clouds to detect and classify the objects among dense 2D BEV pseudo images. In terms of encoding of the 3D objects and their labels in the training dataset, the network in the present embodiment is capable of directly extracting and encoding without further resorting to pre-defined object anchors, or tuning the region proposals passed from the first stage to the second stage. The overall network architecture is illustrated in FIG. 6.

The network architecture provided in the present disclosure may be divided into two sub-networks.

First, the backbone network is used to reclaim general information from the raw BEV representation in the form of convolutional feature maps, and it is compact and has a high representation capability to learn and exploit robust feature representation.

Second, the header network, which has inputs, is composed of the final blocks of the backbone network, and it is designed to learn task-specific predictions. The header network contains five subtasks including the object center point (x,y), the offset information (Δx, Δy), the extending Z coordinate (z), the object size (l,w,h), and the object rotating angle (yaw).

The following details the backbone network and the header network by referring to the drawings.

FIG. 6 shows a detailed CNN architecture of a 3D multi-object detection apparatus according to at least one embodiment of the present disclosure.

As shown in FIG. 6, the overall network of the CNN architecture of the 3D multi-object detection apparatus of the present disclosure is divided into two main parts.

The first is the backbone network and is composed of the following three sub-modules (a, b, c).
a) Res_Block is a modified Resnet block module that represents the set of continuous kernels, down-sampling ratio, and quantity of repetition.
b) US_Block is a module that represents an up-sampling block for each scale.
c) DS_Block is a down-sampling module.

The second is the header network including d) Head module. The main role of this module is to exploit the feature for 5 targets of the object center, which are the offset, Z dimension, 3D object size, and rotation angle for learning tasks.

In deep learning-based object detection tasks, CNNs need to extract the input information in the form of convolutional feature maps. For the learning tasks, the present disclosure provides a compact and robust backbone architecture with the criteria of having fewer layers in a high solution and more layers in a low resolution.

In the embodiment of FIG. 6, the present disclosure provides the network with a total of ten blocks.

The first block is the convolutional layer with channel number 64, kernel 7, padding 3, and stride 2.

The second to the fifth blocks are composed of modified residual layers with a down-sampling factor of 2 for every block having the numbers of skip connections of 3, 8, 8, and 3, respectively.

In total, the down-sampling factor is 32 from the first to fifth blocks.

The sixth to the eighth blocks are top-down up-sampling blocks, while the last two blocks are bottom-up down-sampling blocks. Then, the last three blocks are selected to feed as the input of the header network.

The header network is designed to be small and efficient to learn the multi-specific tasks that handle both classification and 3D object localization. There are five sub-tasks in this network including object center point corresponding with its class ($\hat{x}$, $\hat{y}$), offset information ($\Delta\hat{x}$, $\Delta\hat{y}$), extending $\mathbb{R}^2$ to $\mathbb{R}^3$ coordinate $\hat{z}$, object size ($\hat{l}$, $\hat{w}$, $\hat{h}$), and object rotating angle factors ($\widehat{\cos\phi_i}, \widehat{\sin\phi_i}$). At the inference stage, the present disclosure can easily decode the object's rotating angle as $\tan^{-1}(\widehat{\sin\phi_i}, \widehat{\cos\phi_i})$ within the range of $[-\pi, \pi]$.

The final prediction result is formed as: [C, ($\hat{x}_i+\Delta\hat{x}_i$, $\hat{y}_i+\Delta\hat{y}_i$, $\hat{z}_i$), $\tan^{-1}(\widehat{\sin\phi_i}, \widehat{\cos\phi_i})$, ($\hat{l}_i$, $\hat{w}_i$, $\hat{h}_i$)] for every chosen center point P($\hat{x},\hat{y}$) which has a higher value than the pre-defined threshold.

In the present disclosure, the learning and inference process is implemented in a compact, efficient, and safe manner and to be embedded system-friendly, which will be further described below.

The anchor-free single-stage 3D multi-object detection apparatus according to at least one embodiment of the present disclosure predicts five heads in total for each candidate among a keypoint heatmap head, a local offset head, an object orientation head, a Z-axis position head, and a 3D object dimension head. These heads are needed to produce the final candidates at the inference stages.

The learning process may employ a center regression, offset regression, orientation regression, Z-axis location regression, and size regression. The center regression outputs center points after passing through CNN architecture, each point corresponding to one object category. The shape of the center heat map may be defined as $$\hat{H} \in [0, 1]^{\frac{L}{S} \times \frac{W}{S} \times C},$$

where S is the downsampling ratio and C stands for the number of predicted classes.

Keypoint heatmap H is divided by factor R and used to find where the object center is in the BEV. $\hat{H}_{x,y,c}=1$ stands for detected center point, while $\hat{H}_{x,y,c}=0$ stands for background.

The main roles of the offset regression are to reinforce the object center points' accuracy and mitigate the quantization error in the BEV generation process. To this end, the offset regression is applied to predict the offset feature map $$\hat{O} \in R^{\frac{L}{S} \times \frac{W}{S} \times 2}$$

for every center point. The present disclosure chooses the L1 loss as the learning target for the offset.

For safety, the orientation regression is used to ensure accurate prediction of not only the 3D object location but also the heading angle. The heading angle around Z-axis is considered as the yaw angle, and for the leaning target, the present disclosure encodes the yaw angle φ as (cos(φ), sin(φ)), while in inference the present disclosure decodes the yaw angle φ as $\tan^{-1}(\sin(\phi), \cos(\phi))$.

The orientation regression outputs the feature map:

$$\hat{Y} \in R^{\frac{L}{S} \times \frac{W}{S} \times 2}$$

for every single center point, when the L1 loss function is applied for training as in Equation 2.

$$L_{yaw} = \frac{1}{N} \sum_p \sum_{i \in \{sin(\phi), cos(\phi)\}} |\sigma(\hat{Y}_{\tilde{p},i}) - Y_{p,i}| \quad \text{Equation 2}$$

With the Z-axis location regression, the object center points are predicted in $\mathbb{R}^2$, and an extension along the Z-axis is needed for localizing the center points in $\mathbb{R}^3$. The Z-axis location regression predicts Z-axis feature map $$\hat{Z} \in R^{\frac{L}{S} \times \frac{W}{S} \times 1}$$

for each predicted center point. The Z-axis regression result has a tremendous influence on 3D bounding box localization precision on account of the unbounded regression targets in the Z-axis with various object attribute samples. Thus, the prediction is easily sensitive to outliers, especially the imbalance training set. To overcome this issue, the balanced L1 loss is introduced to minimize the imbalance training set and improve the stability of the model. The balanced L1 loss may be addressed for learning Z-axis regression.

$$L_z = \frac{1}{N} \sum_p L_b(|\hat{Z}_{\tilde{p}} - Z_p|) \quad \text{Equation 3}$$

Where $L_b$ is balanced L1 loss, following the balanced L1 loss definition of Equation 4.

$$L_b(\mu) = \begin{cases} \frac{a}{b}(b|\mu| + 1)\ln(b|\mu| + 1) - a|\mu| & \text{if } |\mu| < 1 \\ \gamma|\mu| + C & \text{otherwise} \end{cases} \quad \text{Equation 4}$$

Being L1 balanced loss hyper-parameters, a, b, γ have the constraint relation by aln(b+1)=γ.

The size regression process produces the 3D object spatial dimension: the length l, width w, and height h along the 3D object center coordinate (x, y, z). This task has three values to predict, so for each center point, it returns a size regression feature map:

$$\tilde{S} \in R^{\frac{L}{S} \times \frac{W}{S} \times 3}.$$

The size regression has the same characteristic as the Z-axis regression, and it is also sensitive to outliers owing to the unbounded regression targets. Hence, the balanced L1 loss is chosen as the learning target for size regression:

$$L_{size} = \frac{1}{N} \sum_p \sum_{i \in \{l,w,h\}} L_b|\hat{S}_{\tilde{p},i} - S_{p,i}| \quad \text{Equation 5}$$

The total loss function of the single-stage 3D multi-object detection apparatus of the present disclosure is the weighted sum of all above head regression losses:

$$L_{total} = \chi_{hm} L_{hm} + \chi_{off} L_{off} + \chi_{yaw} L_{yaw} + \chi_z L_z + \chi_{size} L_{size} \quad \text{Equation 6}$$

Where, $\chi_{hm}$, $\chi_{off}$, $\chi_{yaw}$, $\chi_z$, and $\chi_{size}$ are represented for the balanced coefficients for the heatmap center regression, offset regression, orientation regression, Z-axis location regression, and size regression, respectively.

The following describes an inference process in the single-stage 3D multi-object detection apparatus of the present disclosure.

For accurately localizing 3D bounding boxes, after extracting fine-grained feature maps, the present disclosure first checks the presence of center keypoints by comparing whether whose value is greater than eight connected neighbors. Here, comparing with eight of the neighbors is suitable for both fast and accurate popular method of finding keypoints.

Then, the present disclosure only keeps the center points by two criteria: The center point value is higher than the predefined threshold, and the confidence score filters out the detected center point number in priority order of a redefined object number in the detection range.

The object in the $\mathbb{R}^3$ environment can be described as ($c_x$, $c_y$, $c_z$, r, p, y, l, w, h) where, (cx, $c_y$, $c_z$) is the 3D object center, (r, p, y) represents roll, pitch, and yaw rotating angle, (l, w, h) is the object length, width, and height, respectively.

Assuming that the object is on a flat road plane, r=p=0, so an object in $\mathbb{R}^3$ has 7 degrees of freedom ($c_x$, $c_y$, $c_z$, y, l, w, h). During inference, that $\hat{P}_c = \Sigma_{i=1}^n \{\hat{x}_i, \hat{y}_i\}$ is the set of predictions where n is the quantity of detected center points of class C.

After prediction, ($\hat{x}_i$, $\hat{y}_i$), ($\Delta\hat{x}_i$, $\Delta\hat{y}_i$), ($\widehat{\cos\phi}_i$, $\widehat{\sin\phi}_i$), $\hat{z}_i$, ($\hat{l}_i$, $\hat{w}_i$, $\hat{h}_i$) are obtained corresponding to the heatmap center point, offset, orientation angle, Z-axis location, and size dimension.

Then, all the candidate targets are then fused to produce the accurate 3D bounding box for class C as (C, $\hat{x}_i + \Delta\hat{x}_i$, $\hat{y}_i + \Delta\hat{y}_i$, $\hat{z}_i$, $\tan^{-1}(\widehat{\sin\phi}, \widehat{\cos\phi}_i)$, $\hat{l}_i$, $\hat{w}_i$, $\hat{h}_i$).

The present disclosure handles these tasks as an embedded system-friendly approach. Therefore, the present disclosure can find the object centers by using a lightweight max-pooling operation, way faster than involving the conventional NMS process.

According to some embodiments, by providing a powerful real-time 3D multi-object detection apparatus for autonomous driving, the present disclosure can improve the accuracy of a 3D object detection task while maintaining a very fast inference speed.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. An apparatus for single-stage three-dimensional (3D) multi-object detection by using a LiDAR sensor to detect 3D multiple objects, comprising:
a data input module configured to receive raw 3D point cloud data from the LiDAR sensor;
a BEV image generating module configured to:
generate four feature map images based on a height, a density, an intensity, and a distance of the raw 3D point cloud data, by encoding the raw 3D point cloud data, and
generate bird's eye view (BEV) images by projecting the raw 3D point cloud data into 2D pseudo-images and discretizing a result of the projecting;
a learning module configured to perform a deep learning algorithm-based learning task to extract a fine-grained feature image from the BEV images; and
a localization module configured to perform a regression operation and a localization operation to find 3D candidate boxes and classes corresponding to the 3D candidate boxes for detecting 3D objects from the fine-grained feature image.

2. The apparatus of claim 1, wherein the learning module is configured to perform a convolutional neural network-based (CNN-based) learning task.

3. A method performed by an apparatus for single-stage three-dimensional (3D) multi-object detection by using a LiDAR sensor to detect 3D multiple objects, the method comprising:
performing a data input operation by receiving raw 3D point cloud data from the LiDAR sensor;
generating bird's eye view (BEV) images from the raw point cloud data, comprising:
generating four feature map images based on a height, a density, an intensity, and a distance of the raw 3D point cloud data, by encoding the raw 3D point cloud data, and
generating the BEV images by projecting the raw 3D point cloud data into 2D pseudo-images and discretizing a result of the projecting;
performing a deep learning algorithm-based learning task to extract a fine-grained feature image from the BEV images; and
performing a regression operation and a localization operation to find 3D candidate boxes and classes corresponding to the 3D candidate boxes for detecting 3D objects from the fine-grained feature image.

4. The method of claim 3, wherein the performing of the deep learning algorithm-based learning task comprises:
performing a convolutional neural network-based (CNN-based) learning task.

5. The apparatus of claim 1, wherein the learning module employs a center regression, offset regression, orientation regression, Z-axis location regression and a size regression.

6. The method of claim 3, wherein the performing the regression operation comprises performing a center regression, offset regression, orientation regression, Z-axis location regression and a size regression.

* * * * *